US006961631B1

(12) United States Patent
Puryear

(10) Patent No.: US 6,961,631 B1
(45) Date of Patent: Nov. 1, 2005

(54) EXTENSIBLE KERNEL-MODE AUDIO PROCESSING ARCHITECTURE

(75) Inventor: Martin G. Puryear, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/559,901

(22) Filed: Apr. 26, 2000

Related U.S. Application Data

(60) Provisional application No. 60/197,100, filed on Apr. 12, 2000.

(51) Int. Cl.[7] .............................................. G06F 17/00
(52) U.S. Cl. .......................... 700/94; 84/602; 709/230; 709/238
(58) Field of Search ........................... 700/94; 84/622, 84/602; 713/400; 709/230, 238

(56) References Cited

U.S. PATENT DOCUMENTS 5,616,879 A 4/1997 Yamauchi et al.
5,815,689 A * 9/1998 Shaw et al. ................. 713/400
5,886,275 A 3/1999 Kato et al.
5,977,468 A 11/1999 Fujii
6,143,973 A 11/2000 Kikuchi
6,184,455 B1 * 2/2001 Tamura ....................... 84/625
6,216,173 B1 4/2001 Jones
6,243,753 B1 6/2001 Machin
6,243,778 B1 6/2001 Fung
6,405,255 B1 * 6/2002 Stoltz et al. ................ 709/231
6,424,621 B1 7/2002 Ramaswamy

OTHER PUBLICATIONS

Opcode Internet Reference www.opcode.com/products/max, 2 pages, printed Apr. 4, 2000.
"Logic Audio 4.2", NAMM 2000, Los Angeles, Feb. 3-6, 2000, 2 pages.
Press Release, "Steinberg releases NUENDO for NT", Sep. 24, 1999, 2 pages.
Mark of the Unicorn, Inc., "MOTU Demos Audio Sequencing Milestones in Digital Performer 2.7", Jan. 4, 2000, 4 pages.
Mark of the Unicorn, Inc., "MOTU Ships Digital Performer 2.5 with Integrated Waveform Editor and Mastering Plug-Ins", Dec. 1, 1998, 4 pages.
Wells, "Cakewalk Overture 2 (MAC/WIN): An Old Standby Receives a Major Face-Lift", Electronic Musician, Mar. 1999, 5 pages.

* cited by examiner

*Primary Examiner*—Xu Mei
*Assistant Examiner*—Con P. Tran
(74) *Attorney, Agent, or Firm*—Lee & Hayes, PLLC

(57) ABSTRACT

An extensible kernel-mode audio (e.g., MIDI) processing architecture is implemented using multiple modules that together comprise a module graph. The module graph is implemented in kernel-mode, reducing latency and jitter when handling audio data by avoiding transfers of the audio data to user-mode applications for processing. In one embodiment, the audio processing architecture is readily extensible. A graph builder can readily change the module graph, adding new modules, removing modules, or altering connections as necessary, all while the graph is running.

8 Claims, 10 Drawing Sheets

EXTENSIBLE KERNEL-MODE AUDIO PROCESSING ARCHITECTURE

RELATED APPLICATIONS

This application claims the benefit of U.S. Provisional Application No. 60/197,100, filed Apr. 12, 2000, entitled "Extensible Kernel-Mode Audio Processing Architecture" to Martin G. Puryear.

TECHNICAL FIELD

This invention relates to audio processing systems. More particularly, the invention relates to an extensible kernel-mode audio processing architecture.

BACKGROUND OF THE INVENTION

Musical performances have become a key component of electronic and multimedia products such as stand-alone video game devices, computer-based video games, computer-based slide show presentations, computer animation, and other similar products and applications. As a result, music generating devices and music playback devices are now tightly integrated into electronic and multimedia components.

Musical accompaniment for multimedia products can be provided in the form of digitized audio streams. While this format allows recording and accurate reproduction of non-synthesized sounds, it consumes a substantial amount of memory. As a result, the variety of music that can be provided using this approach is limited. Another disadvantage of this approach is that the stored music cannot be easily varied. For example, it is generally not possible to change a particular musical part, such as a bass part, without re-recording the entire musical stream.

Because of these disadvantages, it has become quite common to generate music based on a variety of data other than pre-recorded digital streams. For example, a particular musical piece might be represented as a sequence of discrete notes and other events corresponding generally to actions that might be performed by a keyboardist-such as pressing or releasing a key, pressing or releasing a sustain pedal, activating a pitch bend wheel, changing a volume level, changing a preset, etc. An event such as a note event is represented by some type of data structure that includes information about the note such as pitch, duration, volume, and timing. Music events such as these are typically stored in a sequence that roughly corresponds to the order in which the events occur. Rendering software retrieves each music event and examines it for relevant information such as timing information and information relating the particular device or "instrument" to which the music event applies. The rendering software then sends the music event to the appropriate device at the proper time, where it is rendered. The MIDI (Musical Instrument Digital Interface) standard is an example of a music generation standard or technique of this type, which represents a musical performance as a series of events.

Computing devices, such as many modern computer systems, allow MIDI data to be manipulated and/or rendered. These computing devices are frequently built based on an architecture employing multiple privilege levels, often referred to as user-mode and kernel-mode. Manipulation of the MIDI data is typically performed by one or more applications executing in user-mode, while the input of data from and output of data to hardware is typically managed by an operating system or a driver executing in kernel-mode.

Such a setup requires the MIDI data to be received by the driver or operating system executing in kernel-mode, transferred to the application executing in user-mode, manipulated by the application as needed in user-mode, and then transferred back to the operating system or driver executing in kernel-mode for rendering. Data transfers between kernel-mode and user-mode, however, can take a considerable and unpredictable amount of time. Lengthy delays can result in unacceptable latency, particularly for real-time audio playback, while unpredictability can result in an unacceptable amount of jitter in the audio data, resulting in unacceptable rendering of the audio data.

The invention described below addresses these disadvantages, providing an extensible kernel-mode audio processing architecture.

SUMMARY OF THE INVENTION

An extensible kernel-mode audio processing architecture is described herein.

According to one aspect, an audio processing architecture is implemented using multiple modules that together form a module graph. The module graph is implemented in kernel-mode, reducing latency and jitter when handling audio data by avoiding transfers of the audio data to user-mode applications for processing.

According to another aspect, the audio processing architecture is a MIDI data processing architecture.

According to another aspect, an interface is described for implementation on each of the multiple modules in a module graph. The interface provides a relatively quick and low-overhead interface for kernel-mode modules to communicate audio data to one another. The interface includes a ConnectOutput interface via which the next module in the graph (that is, the module that audio data should be output to) can be identified to the module, and a DisconnectOutput interface via which the previously-set next module can be cleared (e.g., to a default value, such as an allocator module). The interface also includes a PutMessage interface which is called to pass audio packets to the next module in the graph, and a SetState interface which is called to set the state of the module (e.g., run, stop, or a transitional pause or acquire state).

According to another aspect, the audio processing architecture is readily extensible. The audio processing architecture is implemented as multiple kernel-mode modules connected together in a module graph by a graph builder. The graph builder can readily change the module graph, adding new modules, removing modules, or altering connections as necessary, all while the graph is running.

According to another aspect, the audio processing architecture includes an allocator that allocates memory for data packets that are passed among modules in a kernel-mode module graph. The allocated memory can be on a data packet basis, or alternatively larger buffers may be allocated to accommodate larger portions of audio data.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

General Environment

Figure 1:
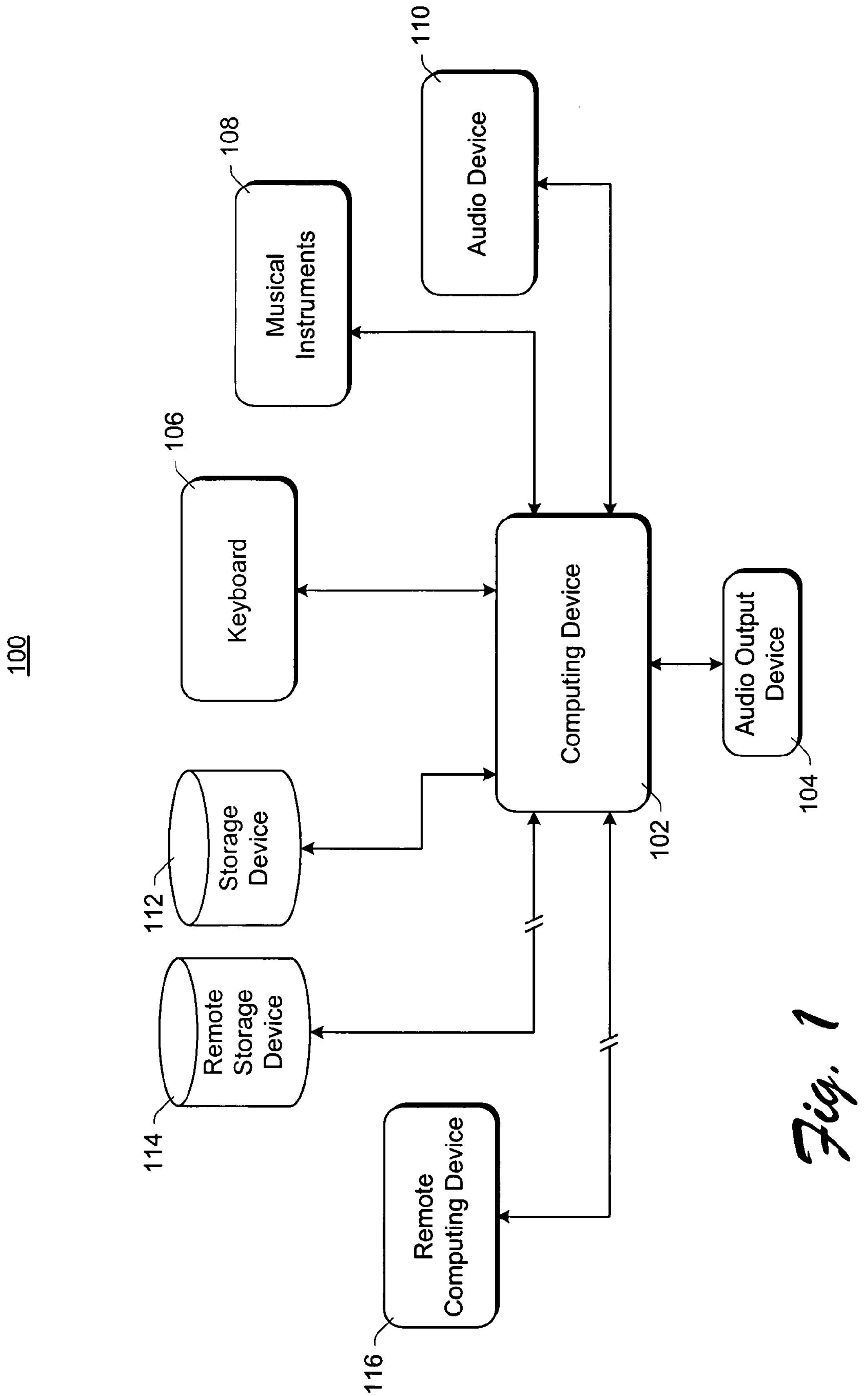
FIG. 1 is a block diagram illustrating an exemplary system for manipulating and rendering audio data.

FIG. 1 is a block diagram illustrating an exemplary system for manipulating and rendering audio data. One type of audio data is defined by the MIDI (Musical Instrument Digital Interface) standard, including both accepted versions of the standard and proposed versions for future adoption. Although various embodiments of the invention are discussed herein with reference to the MIDI standard, other audio data standards can alternatively be used. In addition, other types of audio control information can also be passed, such as volume change messages, audio pan change messages (e.g., changing the manner in which the source of sound appears to move from two or more speakers), a coordinate change on a 3D sound buffer, messages for synchronized start of multiple devices, or any other parameter of how the audio is being processed.

Audio system 100 includes a computing device 102 and an audio output device 104. Computing device 102 represents any of a wide variety of computing devices, such as conventional desktop computers, gaming devices, Internet appliances, etc. Audio output device 104 is a device that renders audio data, producing audible sounds based on signals received from computing device 102. Audio output device 104 can be separate from computing device 102 (but coupled to device 102 via a wired or wireless connection), or alternatively incorporated into computing device 102. Audio output device 104 can be any of a wide variety of audible sound-producing devices, such as an internal personal computer speaker, one or more external speakers, etc.

Computing device 102 receives MIDI data for processing, which can include manipulating the MIDI data, playing (rendering) the MIDI data, storing the MIDI data, transporting the MIDI data to another device via a network, etc. MIDI data can be received from a variety of devices, examples of which are illustrated in FIG. 1. MIDI data can be received from a keyboard 106 or other musical instruments 108 (e.g., drum machine, synthesizer, etc.), another audio device(s) 110 (e.g., amplifier, receiver, etc.), a local (either fixed or removable) storage device 112, a remote (either fixed or removable) storage device 114, another device 116 via a network (such as a local area network or the Internet), etc. Some of these MIDI data sources can generate MIDI data (e.g., keyboard 106, audio device 110, or device 116 (e.g., coming via a network)), while other sources (e.g., storage device 112 or 114, or device 116) may simply be able to transmit MIDI data that has been generated elsewhere.

In addition to being sources of MIDI data, devices 106–116 may also be destinations for MIDI data. Some of the sources (e.g., keyboard 106, instruments 108, device 116, etc.) may be able to render (and possibly store) the audio data, while other sources (e.g., storage devices 112 and 114) may only be able store the MIDI data.

The MIDI standard describes a technique for representing a musical piece as a sequence of discrete notes and other events (e.g., such as might be performed by an instrumentalist). These notes and events (the MIDI data) are communicated in messages that are typically two or three bytes in length. These messages are commonly classified as Channel Voice Messages, Channel Mode Messages, or System Messages. Channel Voice Messages carry musical performance data (corresponding to a specific channel), Channel Mode Messages affect the way a receiving instrument will respond to the Channel Voice Messages, and System Messages are control messages intended for all receivers in the system and are not channel-specific. Examples of such messages include note on and note off messages identifying particular notes to be turned on or off, aftertouch messages (e.g., indicating how long a keyboard key has been held down after being pressed), pitch wheel messages indicating how a pitch wheel has been adjusted, etc. Additional information regarding the MIDI standard is available from the MIDI Manufacturers Association of La Habra, Calif.

In the discussion herein, embodiments of the invention are described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that various embodiments of the invention may be practiced with other computer system configurations, including hand-held devices, gaming consoles, Internet appliances, multiprocessor systems, microprocessor-based or programmable consumer electronics, network PCs, minicomputers, mainframe computers, and the like. In a distributed computer environment, program modules may be located in both local and remote memory storage devices.

Alternatively, embodiments of the invention can be implemented in hardware or a combination of hardware, software, and/or firmware. For example, at least part of the invention can be implemented in one or more application specific integrated circuits (ASICs) or programmable logic devices (PLDs).

Figure 2:
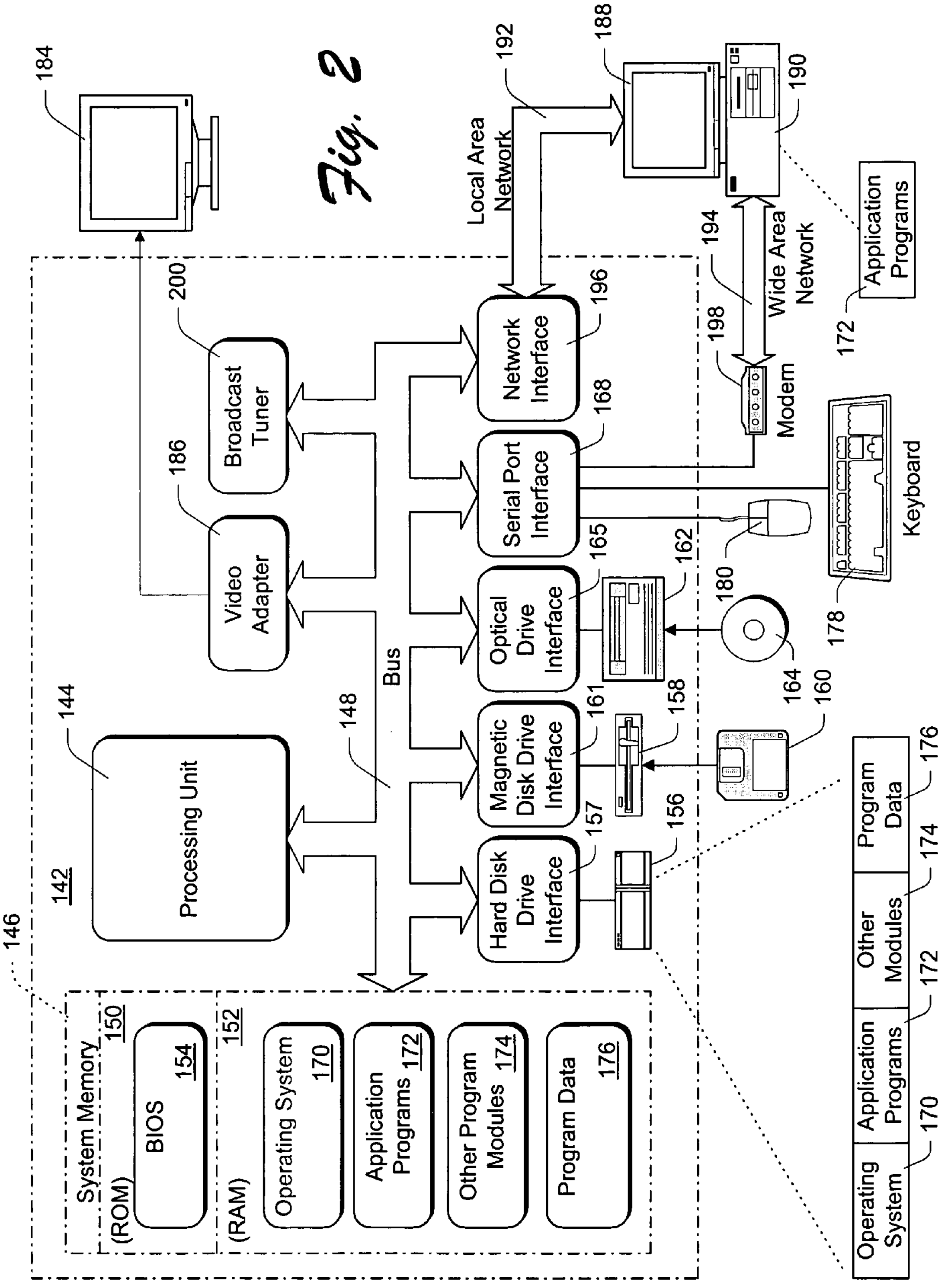
FIG. 2 shows a general example of a computer that can be used in accordance with certain embodiments of the invention.

FIG. 2 shows a general example of a computer 142 that can be used in accordance with certain embodiments of the invention. Computer 142 is shown as an example of a computer that can perform the functions of computing device 102 of FIG. 1.

Computer 142 includes one or more processors or processing units 144, a system memory 146, and a bus 148 that couples various system components including the system memory 146 to processors 144. The bus 148 represents one or more of any of several types of bus structures, including a memory bus or memory controller, a peripheral bus, an accelerated graphics port, and a processor or local bus using any of a variety of bus architectures. The system memory includes read only memory (ROM) 150 and random access memory (RAM) 152. A basic input/output system (BIOS) 154, containing the basic routines that help to transfer information between elements within computer 142, such as during start-up, is stored in ROM 150.

Computer 142 further includes a hard disk drive 156 for reading from and writing to a hard disk, not shown, connected to bus 148 via a hard disk driver interface 157 (e.g., a SCSI, ATA, or other type of interface); a magnetic disk drive 158 for reading from and writing to a removable magnetic disk 160, connected to bus 148 via a magnetic disk drive interface 161; and an optical disk drive 162 for reading from or writing to a removable optical disk 164 such as a CD ROM, DVD, or other optical media, connected to bus 148 via an optical drive interface 165. The drives and their associated computer-readable media provide nonvolatile storage of computer readable instructions, data structures, program modules and other data for computer 142. Although the exemplary environment described herein employs a hard disk, a removable magnetic disk 160 and a removable optical disk 164, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 160, optical disk 164, ROM 150, or RAM 152, including an operating system 170, one or more application programs 172, other program modules 174, and program data 176. A user may enter commands and information into computer 142 through input devices such as keyboard 178 and pointing device 180. Other input devices (not shown) may include a microphone, joystick, game pad, satellite dish, scanner, or the like. These and other input devices are connected to the processing unit 144 through an interface 168 that is coupled to the system bus. A monitor 184 or other type of display device is also connected to the system bus 148 via an interface, such as a video adapter 186. In addition to the monitor, personal computers typically include other peripheral output devices (not shown) such as speakers and printers.

Computer 142 optionally operates in a networked environment using logical connections to one or more remote computers, such as a remote computer 188. The remote computer 188 may be another personal computer, a server, a router, a network PC, a peer device or other common network node, and typically includes many or all of the elements described above relative to computer 142, although only a memory storage device 190 has been illustrated in FIG. 2. The logical connections depicted in FIG. 2 include a local area network (LAN) 192 and a wide area network (WAN) 194. Such networking environments are commonplace in offices, enterprise-wide computer networks, intranets, and the Internet. In the described embodiment of the invention, remote computer 188 executes an Internet Web browser program (which may optionally be integrated into the operating system 170) such as the "Internet Explorer" Web browser manufactured and distributed by Microsoft Corporation of Redmond, Wash.

When used in a LAN networking environment, computer 142 is connected to the local network 192 through a network interface or adapter 196. When used in a WAN networking environment, computer 142 typically includes a modem 198 or other component for establishing communications over the wide area network 194, such as the Internet. The modem 198, which may be internal or external, is connected to the system bus 148 via an interface (e.g., a serial port interface 168). In a networked environment, program modules depicted relative to the personal computer 142, or portions thereof, may be stored in the remote memory storage device. It is to be appreciated that the network connections shown are exemplary and other means of establishing a communications link between the computers may be used.

Computer 142 also optionally includes one or more broadcast tuners 200. Broadcast tuner 200 receives broadcast signals either directly (e.g., analog or digital cable transmissions fed directly into tuner 200) or via a reception device (e.g., via antenna 110 or satellite dish 114 of FIG. 1).

Generally, the data processors of computer 142 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Kernel-Mode Processing

Figure 3:
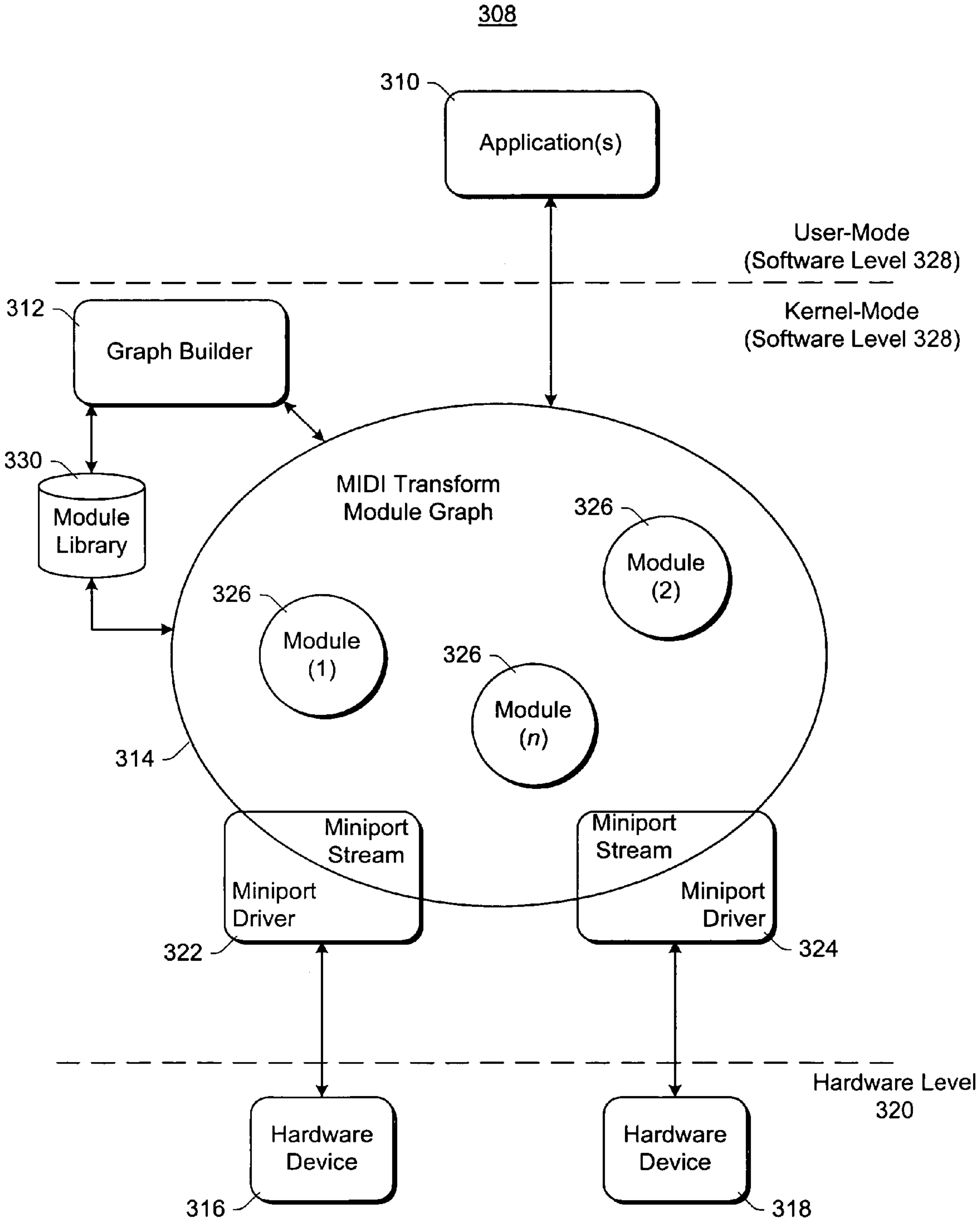
FIG. 3 is a block diagram illustrating an exemplary MIDI processing architecture in accordance with certain embodiments of the invention.

FIG. 3 is a block diagram illustrating an exemplary MIDI processing architecture in accordance with certain embodiments of the invention. The architecture 308 includes application(s) 310, graph builder 312, a MIDI transform module graph 314, and hardware devices 316 and 318. Hardware devices 316 and 318 are intended to represent any of a wide variety of MIDI data input and/or output devices, such as any of devices 104–116 of FIG. 1. Hardware devices 316 and 318 are implemented in hardware level 320 of architecture 308.

Hardware devices 316 and 318 communicate with MIDI transform module graph 314, passing input data to modules in graph 314 and receiving data from modules in graph 314. Hardware devices 316 and 318 communicate with modules in MIDI transform module graph 314 via hardware (HW) drivers 322 and 324, respectively. A portion of each of hardware drivers 322 and 324 is implemented as a module in graph 314 (these portions are often referred to as “miniport streams”), and a portion is implemented in software external to graph 314 (often referred to as “miniport drivers”). For input of MIDI data from a hardware device 316 (or 318), the hardware driver 322 (or 324) reads the data off of the hardware device 316 (or 318) and puts the data in a form expected by the modules in graph 314. For output of MIDI data to a hardware device 316 (or 318), the hardware driver receives the data and writes this data to the hardware directly.

An additional “feeder” module may also be included that is situated between the miniport stream and the rest of the graph 314. Such feeder modules are particularly useful in situations where the miniport driver is not aware of the graph 314 or the data formats and protocols used within graph 314. In such situations, the feeder module operates to convert formats between the hardware (and hardware driver) specific format and the format supported by graph 314. Essentially, for older miniport drivers whose miniport streams don’t communicate in the format supported by graph 314, the FeederIn and FeederOut modules function as their liaison into that graph.

MIDI transform module graph 314 includes multiple (n) modules 326 (also referred to as filters or MXFs (MIDI transform filters)) that can be coupled together. Different source to destination paths (e.g., hardware device to hardware device, hardware device to application, application to hardware device, etc.) can exist within graph 314, using different modules 326 or sharing modules 326. Each module 326 performs a particular function in processing MIDI data. Examples of modules 326 include a sequencer to control the output of MIDI data to hardware device 316 or 318 for playback, a packer module to package MIDI data for output to application 310, etc. The operation of modules 326 is discussed in further detail below.

Modern operating systems (e.g., those in the Microsoft Windows® family of operating systems) typically include multiple privilege levels, often referred to as user and kernel modes of operation (also called “ring 3” and “ring 0”). Kernel-mode is usually associated with and reserved for portions of the operating system. Kernel-mode (or “ring 0”) components run in a reserved address space, which is protected from user-mode components. User-mode (or “ring 3”) components have their own respective address spaces, and can make calls to kernel-mode components using special procedures that require so-called “ring transitions” from one privilege level to another. A ring transition involves a change in execution context, which involves not only a change in address spaces, but also a transition to a new processor state (including register values, stacks, privilege mode, etc). As discussed above, such ring transitions can result in considerable latency and an unpredictable amount of time.

MIDI transform module graph 314 is implemented in kernel-mode of software level 328. Modules 326 are all implemented in kernel-mode, so no ring transitions are required during the processing of MIDI data. Modules 326 are implemented at a deferred procedure call (DPC) level, such as DISPATCH_LEVEL. By implementing modules 326 at a higher priority level than other user-mode software components, the modules 326 will have priority over the user-mode components, thereby reducing delays in executing modules 326 and thus reducing latency and unpredictability in the transmitting and processing of MIDI data.

In the illustrated example, modules 326 are implemented using Win32® Driver Model (WDM) Kernel Streaming filters, thereby reducing the amount of overhead necessary in communicating between modules 326. A low-overhead interface is used by modules 326 to communicate with one another, rather than higher-overhead I/O Request Packets (IRPs), and is described in more detail below. Additional information regarding the WDM Kernel Streaming architecture is available from Microsoft Corporation of Redmond, Wash.

Software level 328 also includes application(s) 310 implemented in user-mode, and graph builder 312 implemented in kernel-mode. Any number of applications 310 can interface with graph 314 (concurrently, in the event of a multi-tasking operating system). Application 310 represents any of a wide variety of applications that may use MIDI data. Examples of such applications include games, reference materials (e.g., dictionaries or encyclopedias) and audio programs (e.g., audio player, audio mixer, etc.).

In the illustrated example, graph builder 312 is responsible for generating a particular graph 314. MIDI transform module graph 314 can vary depending on what MIDI processing is desired. For example, a pitch modification module 326 would be included in graph 314 if pitch modification is desired, but otherwise would not be included. MIDI transform module graph 314 has multiple different modules available to it, although only selected modules may be incorporated into graph 314 at any particular time. In the illustrated example, MIDI transform module graph 314 can include multiple modules 326 that do not have connections to other modules 326—they simply do not operate on received MIDI data. Alternatively, only modules that operate on received MIDI data may be included in graph 314; with graph builder 312 accessing a module library 330 to copy modules into graph 314 when needed.

In one implementation, graph builder 312 accesses one or more locations to identify which modules are available to it. By way of example, a system registry may identify the modules or an index associated with module library 330 may identify the modules. Whenever a new module is added to the system, an identification of the module is added to these one or more locations. The identification may also include a descriptor, usable by graph builder 312 and/or an application 310, to identify the type of functionality provided by the module.

Graph builder 312 communicates with the individual modules 326 to configure graph 314 to carry out the desired MIDI processing functionality, as indicated to graph builder 312 by application 310. Although illustrated as a separate application that is accessed by other user-mode applications (e.g., application 310), graph builder 312 may alternatively be implemented as part of another application (e.g., part of application 310), or may be implemented as a separate application or system process in user-mode.

Application 310 can determine what functionality should be included in MIDI transform module graph 314 (and thus what modules graph builder 312 should include in graph 314) in any of a wide variety of manners. By way of example, application 310 may provide an interface to a user (e.g., a graphical user interface) that allows the user to identify various alterations he or she would like made to a musical piece. By way of another example, application 310 may be pre-programmed with particular functionality of what alterations should be made to a musical piece, or may access another location (e.g., a remote server computer) to obtain the information regarding what alterations should be made to the musical piece. Additionally, graph builder 312 may automatically insert certain functionality into the graph, as discussed in more detail below.

Graph builder 312 can change the connections in MIDI transform module graph 314 during operation of the graph. In one implementation, graph builder 312 pauses or stops operation of graph 314 temporarily in order to make the necessary changes, and then resumes operation of the graph. Alternatively, graph builder 312 may change connections in the graph without stopping its operation. Graph builder 312 and the manner in which it manages graph 314 are discussed in further detail below.

MIDI transform module graphs are thus readily extensible. Graph builder 312 can re-arrange the graph in any of a wide variety of manners to accommodate the desires of an application 310. New modules can be incorporated into a graph to process MIDI data, modules can be removed from the graph so they no longer process MIDI data, connections between modules can be modified so that modules pass MIDI data to different modules, etc.

Communication between applications 310 and MIDI transform module graph 314 transitions between different rings, so some latency and temporal unpredictability may be experienced. In one implementation, communication between applications 310 (or graph builder 312) and a module 326 is performed using conventional IRPs. However, the processing of the MIDI data is being carried out in kernel-mode, so such latency and/or temporal unpredictability does not adversely affect the processing of the MIDI data.

Figure 4:
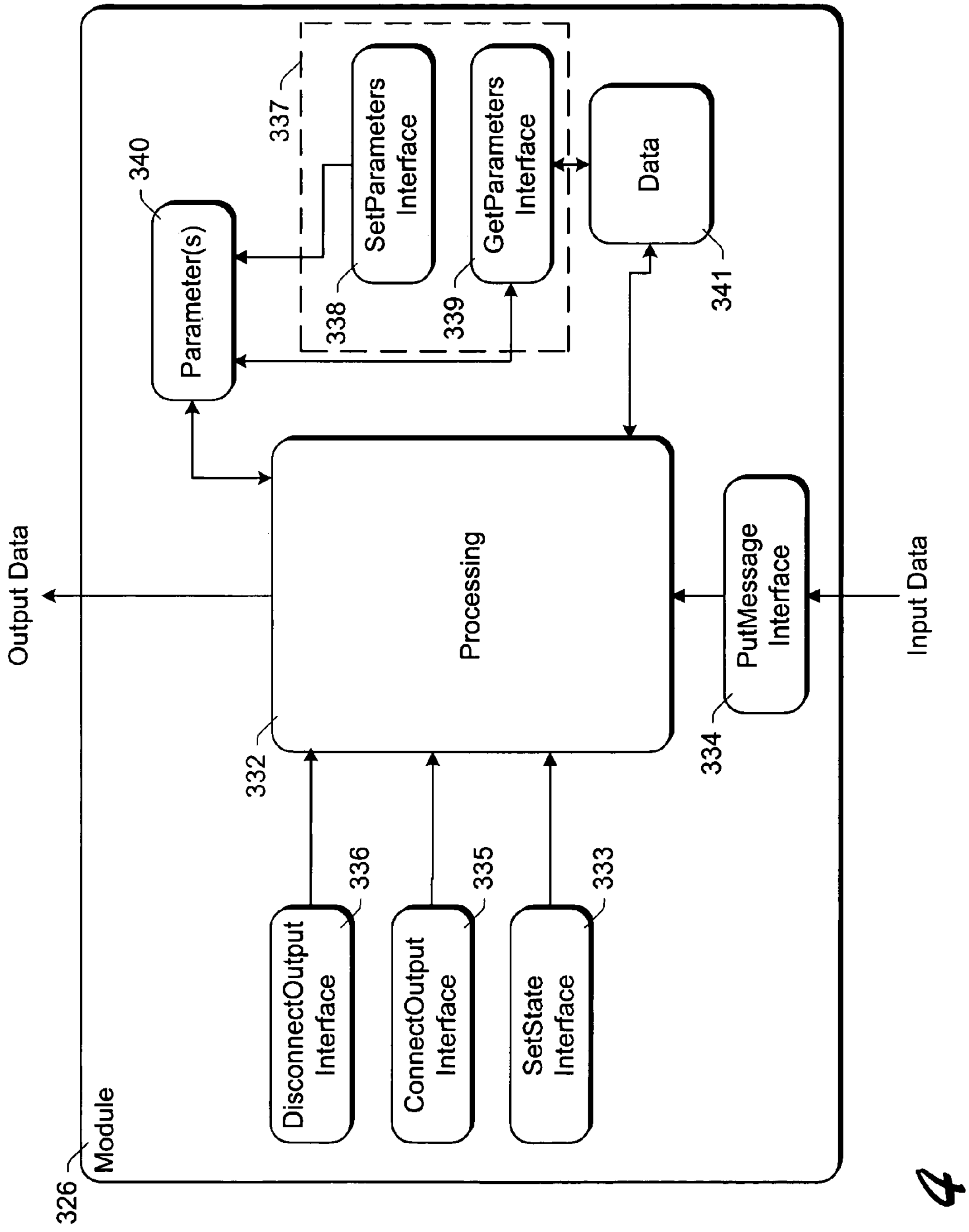
FIG. 4 is a block diagram illustrating an exemplary transform module graph module in accordance with certain embodiments of the invention.

FIG. 4 is a block diagram illustrating an exemplary module 326 in accordance with certain embodiments of the invention. In the illustrated example, each module 326 in graph 314 includes a processing portion 332 in which the operation of the module 326 is carried out (and which varies by module). Each module 326 also includes four interfaces: SetState 333, PutMessage 334, ConnectOutput 335, and DisconnectOutput 336.

The SetState interface 333 allows the state of a module 326 to be set (e.g., by an application 310 or graph builder 312). In one implementation, valid states include run, acquire, pause, and stop. The run state indicates that the module is to run and perform its particular function. The acquire and pause states are transitional states that can be used to assist in transitioning between the run and stop states. The stop state indicates that the module is to stop running (it won't accept any inputs or provide any outputs). When the SetState interface 333 is called, one of the four valid states is included as a parameter by the calling component.

The PutMessage interface 334 allows MIDI data to be input to a module 326. When the PutMessage interface 334 is called by another module, a pointer to the MIDI data being passed (e.g., a data packet, as discussed in more detail below) is included as a parameter, allowing the pointer to the MIDI data to be forwarded to processing portion 332 for processing of the MIDI data. The PutMessage interface 334 is called by another module 326, after it has finished processing the MIDI data it received, and which passes the processed MIDI data to the next module in the graph 314. After processing portion 332 finishes processing the MIDI data, the PutMessage interface on the next module in the graph is called by processing portion 332 to transfer the processed MIDI data to the connected module 326 (the next module in the graph, as discussed below).

The ConnectOutput interface 335 allows a module 326 to be programmed with the connected module (the next module in the graph). The ConnectOutput interface is called by graph builder 312 to identify to the module where the output of the module should be sent. When the ConnectOutput interface 335 is called, an identifier (e.g., pointer to) the next module in the graph is included as a parameter by the calling component. The default connected output is the allocator (discussed in more detail below). In one implementation (called a "splitter" module), a module 326 can be programmed with multiple connected modules (e.g., by programming the module 326 with the PutMessage interfaces of each of the multiple connected modules), allowing outputs to multiple "next" modules in the graph. Conversely, multiple modules can point at a single "next" output module (e.g., multiple modules may be programmed with the PutMessage interface of the same "next" module).

The DisconnectOutput interface 336 allows a module 326 to be disconnected from whatever module it was previously connected to (via the ConnectOutput interface). The DisconnectOutput interface 336 is called by graph builder 312 to have the module 326 reset to a default connected output (the allocator). When the DisconnectOutput interface 336 is called, an identifier (e.g., pointer to) the module being disconnected from is included as a parameter by the calling component. In one implementation, calling the ConnectOutput interface 335 or DisconnectOutput interface 336 with a parameter of NULL also disconnects the "next" reference. Alternatively, the DisconnectOutput interface 336 may not be included (e.g., disconnecting the module can be accomplished by calling ConnnectOutput 335 with a NULL parameter, or with an identification of the allocator module as the next module).

Additional interfaces 337 may also be included on certain modules, depending on the functions performed by the module. Two such additional interfaces 337 are illustrated in FIG. 4: a SetParameters interface 338 and a GetParameters interface 339. The SetParameters interface 338 allows a module 326 to receive various operational parameters set (e.g., from applications 310 or graph builder 312), which are maintained as parameters 340. For example, a module 326 that is to alter the pitch of a particular note(s) can be programmed, via the SetParameters interface 338, with which note is to be altered and/or how much the pitch is to be altered.

The GetParameters interface 339 allows coefficients (e.g., operational parameters maintained as parameters 340) previously sent to the module, or any other information the module may have been storing in a data section 341 (such as MIDI jitter performance profiling data, number of events left in the allocator's free memory pool, how much memory is currently allocated by the allocator, how many messages have been enqueued by a sequencer module, a breakdown by channel and/or channel group of what messages have been enqueued by the sequencer module, etc), to be retrieved. The GetParameters interface 339 and SetParameters interface 338 are typically called by graph builder 312, although other applications 310 or modules in graph 314 could alternatively call them.

Returning to FIG. 3, one particular module that is included in MIDI transform module graph 314 is referred to as the allocator. The allocator module is responsible for obtaining memory from the memory manager (not shown) of the computing device and making portions of the obtained memory available for MIDI data. The allocator module makes a pool of memory available for allocation to other modules in graph 314 as needed. The allocator module is called by another module 326 when MIDI data is received into the graph 314 (e.g., from hardware device 316 or 318, or application 310). The allocator module is also called when MIDI data is transferred out of the graph 314 (e.g., to hardware device 316 or 318, or application 310) so that memory that was being used by the MIDI data can be reclaimed and re-allocated for use by other MIDI data.

The allocator includes the interfaces discussed above, as well as additional interfaces that differ from the other modules 326. In the illustrated example, the allocator includes four additional interfaces: GetMessage, GetBufferSize, GetBuffer, and PutBuffer.

The GetMessage interface is called by another module 326 to obtain a data structure into which MIDI data can be input. The modules 326 communicate MIDI data to one another using a structure referred to as a data packet or event. Calling the GetMessage interface causes the allocator to return to the calling module a pointer to such a data packet in which the calling module can store MIDI data.

The PutMessage interface for the allocator takes a data structure and returns it to the free pool of packets that it maintains. This consists of its "processing."The allocator is the original source and the ultimate destination of all event data structures of this type.

MIDI data is typically received in two or three byte messages. However, situations can arise where larger portions of MIDI data are received, referred to as System Exclusive, or SysEx messages. In such situations, the allocator allocates a larger buffer for the MIDI data, such as 60 bytes or 4096 bytes. The GetBufferSize interface is called by a module 326, and the allocator responds with the size of the buffer that is (or will be) allocated for the portion of data. In one implementation, the allocator always allocates buffers of the same size, so the response by the allocator is always the same.

The GetBuffer interface is called by a module 326 and the allocator responds by passing, to the module, a pointer to the buffer that can be used by the module for the portion of MIDI data.

The PutBuffer interface is called by a module 326 to return the memory space for the buffer to the allocator for re-allocation (the PutMessage interface described above will call PutBuffer in turn, to return the memory space to the allocator, if this hasn't been done already). When calling the PutBuffer interface, the calling module includes, as a parameter, a pointer to the buffer being returned to the allocator.

Situations can also arise where the amount of memory that is allocated by the allocator for a buffer is smaller than the portion of MIDI data that is to be received. In this situation, multiple buffers are requested from the allocator and are "chained" together (e.g., a pointer in a data packet corresponding to each identifies the starting point of the next buffer). An indication may also be made in the corresponding data packet that identifies whether a particular buffer stores the entire portion of MIDI data or only a sub-portion of the MIDI data.

Many modern processors and operating systems support virtual memory. Virtual memory allows the operating system to allocate more memory to application processes than is physically available in the computing device. Data can then be swapped between physical memory (e.g., RAM) and another storage device (e.g., a hard disk drive), a process referred to as paging. The use of virtual memory gives the appearance of more physical memory being available in the computing device than is actually available. The tradeoff, however, is that swapping data from a disk drive to memory typically takes significantly longer than simply retrieving the data directly from memory.

In one implementation, the allocator obtains non-pageable portions of memory from the memory manager. That is, the memory that is obtained by the allocator refers to a portion of physical memory that will not be swapped to disk. Thus, processing of MIDI data will not be adversely affected by delays in swapping data between memory and a disk.

In one implementation, each module 326, when added to graph 314, is passed an identifier (e.g., pointer to) the allocator module as well as a clock. The allocator module is used, as described above, to allow memory for MIDI data to be obtained and released. The clock is a common reference clock that is used by all of the modules 326 to maintain synchronization with one another. The manner in which the clock is used can vary, depending on the function performed by the modules. For example, a module may generate a time stamp, based on the clock, indicating when the MIDI data was received by the module, or may access a presentation time for the data indicating when it is to be played back.

Alternatively, some modules may not need, and thus need not include, pointers to the reference clock and/or the allocator module (however, in implementations where the default output destination for each module is an allocator module, then each module needs a pointer to the allocator in order to properly initialize). For example, if a module will carry out its functionality without regard for what the current reference time is, then a pointer to the reference clock is not necessary.

Figure 5:
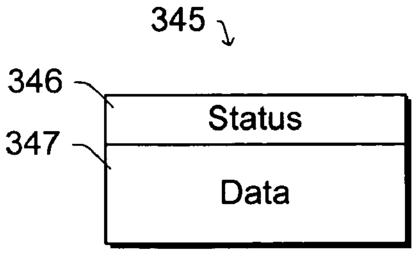
FIG. 5 is a block diagram illustrating an exemplary MIDI message.

FIG. 5 is a block diagram illustrating an exemplary MIDI message 345. MIDI message 345 includes a status portion 346 and a data portion 347. Status portion 346 is one byte, while data portion 347 is either one or two bytes. The size of data portion 347 is encoded in the status portion 346 (either directly, or inherently based on some other value (such as the type of command)). The MIDI data is received from and passed to hardware devices 316 and 318 of FIG. 3, and possibly application 310, as messages 345. Typically each message 345 identifies a single command (e.g., note on, note off, change volume, pitch bend, etc.). The audio data included in data portion 347 will vary depending on the message type.

Figure 6:
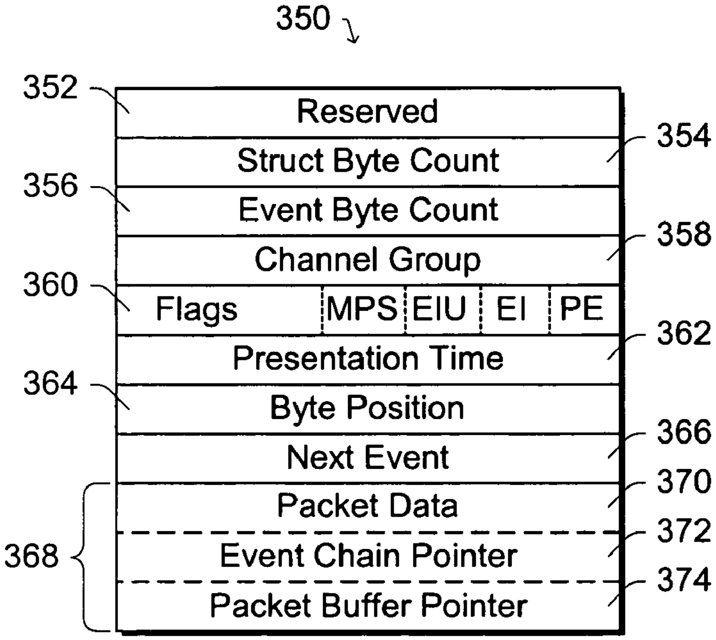
FIG. 6 is a block diagram illustrating an exemplary MIDI data packet in accordance with certain embodiments of the invention.

FIG. 6 is a block diagram illustrating an exemplary MIDI data packet 350 in accordance with certain embodiments of the invention. MIDI data (or references, such as pointers, thereto) is communicated among modules 326 in MIDI transform module graph 314 of FIG. 3 as data packets 350, also referred to as events. When a MIDI message 345 of FIG. 5 is received into graph 314, the receiving module 326 generates a data packet 350 that incorporates the message.

Data packet 350 includes a reserved portion 352 (e.g., one byte), a structure byte count portion 354 (e.g., one byte), an event byte count portion 356 (e.g. two bytes), a channel group portion 358 (e.g., two bytes), a flags portion 360 (e.g. two bytes), a presentation time portion 362 (e.g., eight bytes), a byte position 364 (e.g., eight bytes), a next event portion 366 (e.g. four bytes), and a data portion 368 (e.g., four bytes). Reserved portion 352 is reserved for future use. Structure byte count portion 354 identifies the size of the message 350.

Event byte count portion 356 identifies the number of data bytes that are referred to in data portion 368. The number of data bytes could be the number actually stored in data portion 368 (e.g., two or three, depending on the type of MIDI data), or alternatively the number of bytes pointed to by a pointer in data portion 368, (e.g., if the number of data bytes is greater than the size of a pointer). If the event is a package event (pointing to a chain of events, as discussed in more detail below), then the portion 356 has no value.

Alternatively, portion 356 could be set to the value of event byte count portion 356 of the first regular event in its chain, or to the byte count of the entire long message. If event portion 356 is not set to the byte count of the entire long message, then data could still be flowing 11 into the last message structure of the package event while the initial data is already being processed elsewhere.

Channel group portion 358 identifies which of multiple channel groups the data identified in data portion 368 corresponds to. The MIDI standard supports sixteen different channels, allowing essentially sixteen different instruments or "voices" to be processed and/or played concurrently for a musical piece. Use of channel groups allows the number of channels to be expanded beyond sixteen. Each channel group can refer to any one of sixteen channels (as encoded in status byte 346 of message 345 of FIG. 5). In one implementation, channel group portion 358 is a 2-byte value, allowing up to 65,536 (64 k) different channel groups to be identified (as each channel group can have up to sixteen channels, this allows a total of 1,048,576 (1 Meg) different channels).

Flags portion 360 identifies various flags that can be set regarding the MIDI data corresponding to data packet 350. In one implementation, zero or more of multiple different flags can be set: an Event In Use (EIU) flag, an Event Incomplete (EI) flag, one or more MIDI Parse State flags (MPS), or a Package Event (PE) flag. The Event In Use flag should always be on (set) when an event is traveling through the system; when it is in the free pool this bit should be cleared. This is used to prevent memory corruption. The Event Incomplete flag is set if the event continues beyond the buffer pointed to by data portion 368, or if the message is a System Exclusive (SysEx) message. The MIDI Parse State flags are used by a capture sink module (or other module parsing an unparsed stream of MIDI data) in order to keep track of the state of the unparsed stream of MIDI data. As the capture sink module successfully parses the MIDI data into a complete message, these two bits should be cleared. In one implementation these flags have been removed from the public flags field.

The Package Event flag is set if data packet 350 points to a chain of other packets 350 that should be dealt with atomically. By way of example, if a portion of MIDI data is being processed that is large enough to require a chain of data packets 350, then this packet chain should be passed around atomically (e.g., not separated so that a module receives only a portion of the chain). Setting the Package Event flag identifies data field 374 as pointing to a chain of multiple additional packets 350.

Presentation time portion 362 specifies the presentation time for the data corresponding to data packet 350 (i.e., for an event). The presentation of an event depends on the type of event: note on events are presented by rendering the identified note, note off events are presented by ceasing rendering of the identified note, pitch bend events are presented by altering the pitch of the identified note in the identified manner, etc. A module 326 of FIG. 3, by comparing the current reference clock time to the presentation time identified in portion 362, can determine when, relative to the current time, the event should be presented to a hardware device 316 or 318. In one implementation, portion 362 identifies presentation times in 100 nanosecond (ns) units.

Byte position portion 364 identifies where this message (included in data portion 368) is situated in the overall stream of bytes from the application (e.g., application 310 of FIG. 3). Because certain applications use the release of their submitted buffers as a timing mechanism, it is important to keep track of how far processing has gone in the byte order, and release buffers only up to that point (and only release those buffers back to the application after the corresponding bytes have actually been played). In this case the allocator module looks at the byte offset when a message is destroyed (returned for re-allocation), and alerts a stream object (e.g., the IRP stream object used to pass the buffer to graph 314) that a certain amount of memory can be released up to the client application.

Next event portion 366 identifies the next packet 350 in a chain of packets, if any. If there is no next packet, then next event portion 366 is NULL.

Data portion 368 can include one of three things: packet data 370 (a message 345 of FIG. 5), a pointer 372 to a chain of packets 350, or a pointer 374 to a data buffer. Which of these three things is included in data portion 368 can be determined based on the value in event byte count field 356 and/or flags portion 360. In the illustrated example, the size of a pointer is greater than three bytes (e.g., is 4 bytes). If the event byte count field 356 is less than or equal to the size of a pointer, then data portion 368 includes packet data 370; otherwise data portion 368 includes a pointer 374 to a data buffer. However, this determination is overridden if the Package Event flag of flags portion 360 is set, which indicates that data portion 368 includes a pointer 372 to a chain of packets (regardless of the value of event byte count field 356).

Returning to FIG. 3, certain modules 326 may receive MIDI data from application 310 and/or send MIDI data to application 310. In the illustrated example, MIDI data can be received from and/or sent to an application 310 in different formats, depending at least in part on whether application 310 is aware of the MIDI transform module graph 314 and the format of data packets 350 (of FIG. 5) used in graph 314. If application 310 is not aware of the format of data packets 350 then application 310 is referred to as a "legacy" application and the MIDI data received from application 310 is converted into the format of data packets 350. Application 310, whether a legacy application or not, communicates MIDI data to (or receives MIDI data from) a module 326 in a buffer including one or more MIDI messages (or data packets 350).

Figure 7:
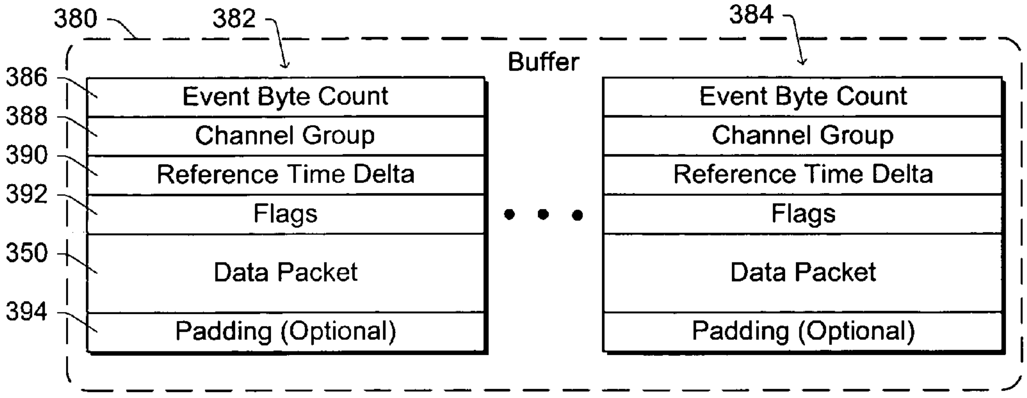
FIG. 7 is a block diagram illustrating an exemplary buffer for communicating MIDI data between a non-legacy application and a MIDI transform module graph module in accordance with certain embodiments of the invention.

FIG. 7 is a block diagram illustrating an exemplary buffer for communicating MIDI data between a non-legacy application and a MIDI transform module graph module in accordance with certain embodiments of the invention. A buffer 380, which can be used to store one or more packaged data packets, is illustrated including multiple packaged data packets 382 and 384. Each packaged data packet 382 and 384 includes a data packet 350 of FIG. 6 as well as additional header information. This combination of data packet 350 and header information is referred to as a packaged data packet. In one implementation, packaged data packets are quadword (8-byte) aligned for alignment and speed reasons (e.g., by adding padding 394 as needed).

The header information for each packaged data packet includes an event byte count portion 386, a channel group portion 388, a reference time delta portion 390, and a flags portion 392. The event byte count portion 386 identifies the number of bytes in the event(s) corresponding to data packet 350 (which is the same value as maintained in event portion 356 of data packet 350 of FIG. 6, unless the packet is broken up into multiple events structures.). The channel group portion 388 identifies which of multiple channel groups the event(s) corresponding to data packet 350 correspond to (which is the same value as maintained in channel group portion 358 of data packet 350).

The reference time delta portion 390 identifies the difference in presentation time between packaged data packet 382 (stored in presentation time portion 362 of data packet 350 of FIG. 6) and the beginning of buffer 380. The beginning time of buffer 380 can be identified as the presentation time of the first packaged data packet 382 in buffer 380, or alternatively buffer 380 may have a corresponding start time (based on the same reference clock as the presentation time of data packets 350 are based on).

Flags portion 392 identifies one or more flags that can be set regarding the corresponding data packet 350. In one implementation, only one flag is implemented—an Event Structured flag that is set to indicate that structured data is included in data packet 350. Structured data is expected to parse correctly from a raw MIDI data stream into complete message packets. An unstructured data stream is perhaps not MIDI compliant, so it isn't grouped into MIDI messages like a structured stream is—the original groupings of bytes of unstructured data are unmodified. Whether the data is compliant (structured) or non-compliant (unstructured) is indicated by the Event Structured flag.

Figure 8:
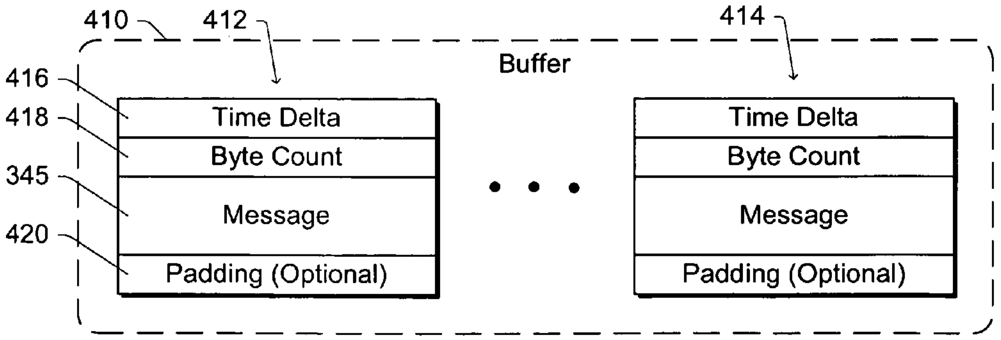
FIG. 8 is a block diagram illustrating an exemplary buffer for communicating MIDI data between a legacy application and a MIDI transform module graph module in accordance with certain embodiments of the invention.

FIG. 8 is a block diagram illustrating an exemplary buffer for communicating MIDI data between a legacy application and a MIDI transform module graph module in accordance with certain embodiments of the invention. A buffer 410, which can be used to store one or more packaged events, is illustrated including multiple packaged events 412 and 414. Each packaged event 412 and 414 includes a message 345 of FIG. 5 as well as additional header information. This combination of message 345 and header information is referred to as a packaged event (or packaged message). In one implementation, packaged events are quadword (8-byte) aligned for speed and alignment reasons (e.g., by adding padding 420 as needed).

The additional header information in each packaged event includes a time delta portion 416 and a byte count portion 418. Time delta portion 416 identifies the difference between the presentation time of the packaged event and the presentation time of the immediately preceding packaged event. These presentation times are established by the legacy application passing the MIDI data to the graph. For the first packaged event in buffer 410, time delta portion 416 identifies the difference between the presentation time of the packed event and the beginning time corresponding to buffer 410. The beginning time corresponding to buffer 410 is the presentation time for the entire buffer (the first message in the buffer can have some positive offset in time and does not have to start right at the 19 head of the buffer).

Byte count portion 416 identifies the number of bytes in message 345.

Figure 9:
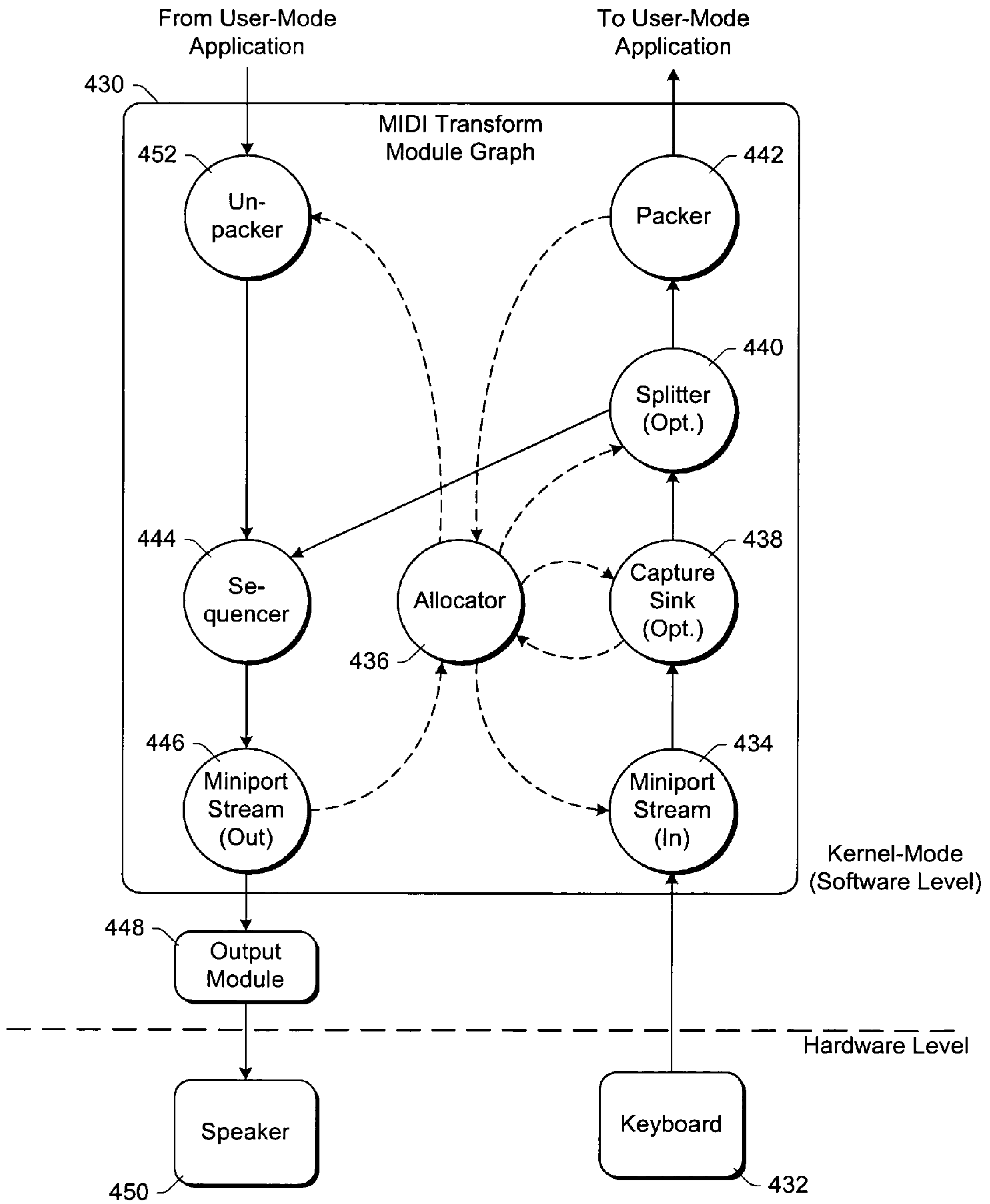
FIG. 9 is a block diagram illustrating an exemplary MIDI transform module graph such as may be used in accordance with certain embodiments of the invention.

FIG. 9 is a block diagram illustrating an exemplary MIDI transform module graph 430 such as may be used in accordance with certain embodiments of the invention. In the illustrated example, keys on a keyboard can be activated and the resultant MIDI data forwarded to an application executing in user-mode as well as being immediately played back. Additionally, MIDI data can be input to graph 430 from a user-mode application for playback.

One source of MIDI data in FIG. 9 is keyboard 432, which provides the MIDI data as a raw stream of MIDI bytes via a hardware driver including a miniport stream (in) module 434. Module 434 calls the GetMessage interface of allocator 436 for memory space (a data packet 350) into which a structured packet can be placed, and module 434 adds a timestamp to the data packet 350. Alternatively, module 434 may rely on capture sink module 438, discussed below, to generate the packets 350, in which case module 434 adds a timestamp to each byte of the raw data it receives prior to forwarding the data to capture sink module 438. In the illustrated example, notes are to be played immediately upon activation of the corresponding key on keyboard 432, so the timestamp stored by module 434 as the presentation time of the data packets 350 is the current reading of the master (reference) clock.

Module 434 is connected to capture sink module 438, splitter module 440 or packer 442 (the splitter module is optional—only inserted if, for example, the graph builder has been told to connect "kernel THRU"). Capture sink module 438 is optional, and operates to generate packets 350 from a received MIDI data byte stream. If module 434 generates packets 350, then capture sink 438 is not necessary and module 434 is connected to optional splitter module 440 or packer 442. However, if module 434 does not generate packets 350, then module 434 is connected to capture sink module 438. After adding the timestamp, module 434 calls the PutMessage interface of the module it is connected to (either capture sink module 438, splitter module 440 or packer module 442), which passes the newly created message to that module.

The manner in which packets 350 are generated from the received raw MIDI data byte stream (regardless of whether it is performed by module 434 or capture sink module 438) is dependent on the particular type of data (e.g., the data may be included in data portion 368 (FIG. 6), a pointer may be included in data portion 368, etc.). In situations where multiple bytes of raw MIDI data are being stored in data portion 368, the timestamp of the first of the multiple bytes is used as the timestamp for the packet 350. Additionally, situations can arise where additional event structures have been obtained from allocator 436 than are actually needed (e.g., multiple bytes were not received together and multiple event structures were received for each, but they are to be grouped together in the same event structure). In such situations the additional event structures can be kept for future MIDI data, or alternatively returned to allocator 436 for re-allocation.

Splitter module 440 operates to duplicate received data packets 350 and forward each to a different module. In the illustrated example, splitter module 440 is connected to both packer module 442 and sequencer module 444. Upon receipt of a data packet 350, splitter module 440 obtains additional memory space from allocator 436, copies the contents of the received packet into the new packet memory space, and calls the PutMessage interfaces of the modules it is connected to, which passes one data packet 350 to each of the connected modules (i.e., one data packet to packer module 442 and one data packet to sequencer module 444). Splitter module 440 may optionally operate to duplicate a received data packet 350 only if the received data packet corresponds to audio data matching a particular type, such as certain note(s), channel(s), and/or channel group(s).

Packer module 442 operates to combine one or more received packets into a buffer (such as buffer 380 of FIG. 7 or buffer 410 of FIG. 8) and forward the buffer to a user-mode application (e.g., using IRPs with a message format desired by the application). Two different packer modules can be used as packer module 442, one being dedicated to legacy applications and the other being dedicated to non-legacy applications. Alternatively, a single packer module may be used and the type of buffer (e.g., buffer 380 or 410) used by packer module 442 being dependent on whether the application to receive the buffer is a legacy application.

Once a data packet is forwarded to the user-mode application, packer 442 calls its programmed PutMessage interface (the PutMessage interface that the module packer 442 is connected to) for that packet. Packer module 442 is connected to allocator module 436, so calling its programmed PutMessage interface for a data packet returns the memory space used by the data packet to allocator 436 for re-allocation. Alternatively, packer 442 may wait to call allocator 436 for each packet in the buffer after the entire buffer is forwarded to the user-mode application.

Sequencer module 444 operates to control the delivery of data packets 350 received from splitter module 440 to miniport stream (out) module 446 for playing on speakers 450. Sequencer module 444 does not change the data itself, but module 444 does reorder the data packets by timestamp and delay the calling of PutMessage (to forward the message on) until the appropriate time. Sequencer module 444 is connected to module 446, so calling PutMessage causes sequencer module 444 to forward a data packet to module 446. Sequencer module 444 compares the presentation times of received data packets 350 to the current reference time. If the presentation time is equal to or earlier than the current time then the data packet 350 is to be played back immediately and the PutMessage interface is called for the packet. However, if the presentation time is later than the current time, then the data packet 350 is queued until the presentation time is equal to the current time, at which point sequencer module 444 calls its programmed PutMessage interface for the packet. In one implementation, sequencer 444 is a high-resolution sequencer, measuring time in 100 ns units.

Alternatively, sequencer-module 444 may attempt to forward packets to module 446 slightly in advance of their presentation time (that is, when the presentation time of the packet is within a threshold amount of time later than the current time). The amount of this threshold time would be, for example, an anticipated amount of time that is necessary for the data packet to pass through module 446 and to speakers 450 for playing, resulting in playback of the data packets at their presentation times rather than submission of the packets to module 446 at their presentation times. An additional "buffer" amount of time may also be added to the anticipated amount of time to allow output module 448 (or speakers 450) to have the audio messages delivered at a particular time (e.g., five seconds before the data needs to be rendered by speakers 450).

A module 446 could furthermore specify that it did not want the sequencer to hold back the data at all, even if data were extremely early. In this case, the HW driver "wants to do its own sequencing," so the sequencer uses a very high threshold (or alternatively a sequencer need not be inserted above this particular module 446). The module 446 is receiving events with presentation timestamps in them, and it also has access to the clock (e.g., being handed a pointer to it when it was initialized), so if the module 446 wanted to synchronize that clock to its own very-high performance clock (such as an audio sample clock), it could potentially achieve even higher resolution and lower jitter than the built-in clock/sequencer.

Module 446 operates as a hardware driver customized to the MIDI output device 450. Module 446 converts the information in the received data packets 350 to a form specific to the output device 450. Different manufacturers can use different signaling techniques, so the exact manner in which module 446 operates will vary based on speakers 450 (and/or output module 448). Module 446 is coupled to an output module 448 which synthesizes the MIDI data into sound that can be played by speakers 450. Although illustrated in the software level, output module 448 may alternatively be implemented in the hardware level. By way of example, module 446 may be a MIDI output module which synthesizes MIDI messages into sound, a MIDI-to-waveform converter (often referred to as a software synthesizer), etc. In one implementation, output module 448 is included as part of a hardware driver corresponding to output device 450.

Module 446 is connected to allocator module 436. After the data for a data packet has been communicated to the output device 450, module 446 calls the PutMessage interface of the module it is connected to (allocator 436) to return the memory space used by the data packet to allocator 436 for re-allocation.

Another source of MIDI data illustrated in FIG. 9 is a user-mode application(s). A user-mode application can transmit MIDI data to unpacker module 452 in a buffer (such as buffer 380 of FIG. 7 or buffer 410 of FIG. 8). Analogous to packer module 442 discussed above, different unpacker modules can be used as unpacker module 452, (one being dedicated to legacy applications and the other being dedicated to non-legacy applications), or alternatively a single dual-mode unpacker module may be used. Unpacker module 452 operates to convert the MIDI data in the received buffer into data packets 350, obtaining memory space from allocator module 436 for generation of the data packets 350. Unpacker module 452 is connected to sequencer module 444. Once a data packet 350 is created, unpacker module 452 calls its programmed PutMessage interface to transmit the data packet 350 to sequencer module 444. Sequencer module 444, upon receipt of the data packet 350, operates as discussed above to either queue the data packet 350 or immediately transfer the data packet 350 to module 446. Because the unpacker 450 has done its job of converting the data stream from a large buffer into smaller individual data packets, these data packets can be easily sorted and interleaved with a data stream also entering the sequencer 444—from the splitter 440 for example.

Figure 10:
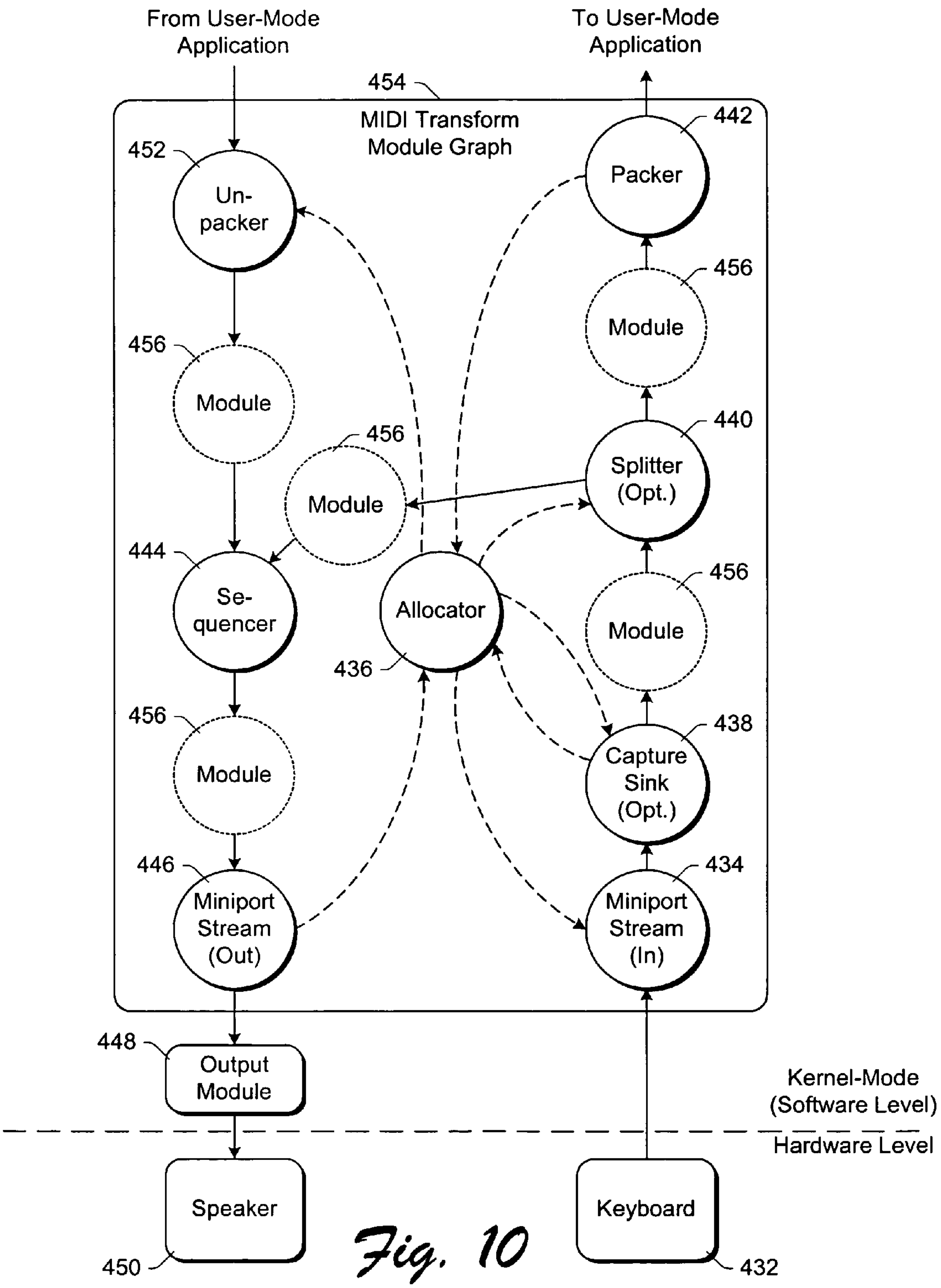
FIG. 10 is a block diagram illustrating another exemplary MIDI transform module graph such as may be used in accordance with certain embodiments of the invention.

FIG. 10 is a block diagram illustrating another exemplary MIDI transform module graph 454 such as may be used in accordance with certain embodiments of the invention. Graph 454 of FIG. 10 is similar to graph 430 of FIG. 9, except that one or more additional modules 456 that perform various operations are added to graph 454 by graph builder 312 of FIG. 3. As illustrated, one or more of these additional modules 456 can be added in graph 454 in a variety of different locations, such as between modules 438 and 440, between modules 440 and 442, between modules 440 and 444, between modules 452 and 444, and/or between modules 444 and 446.

Figure 11:
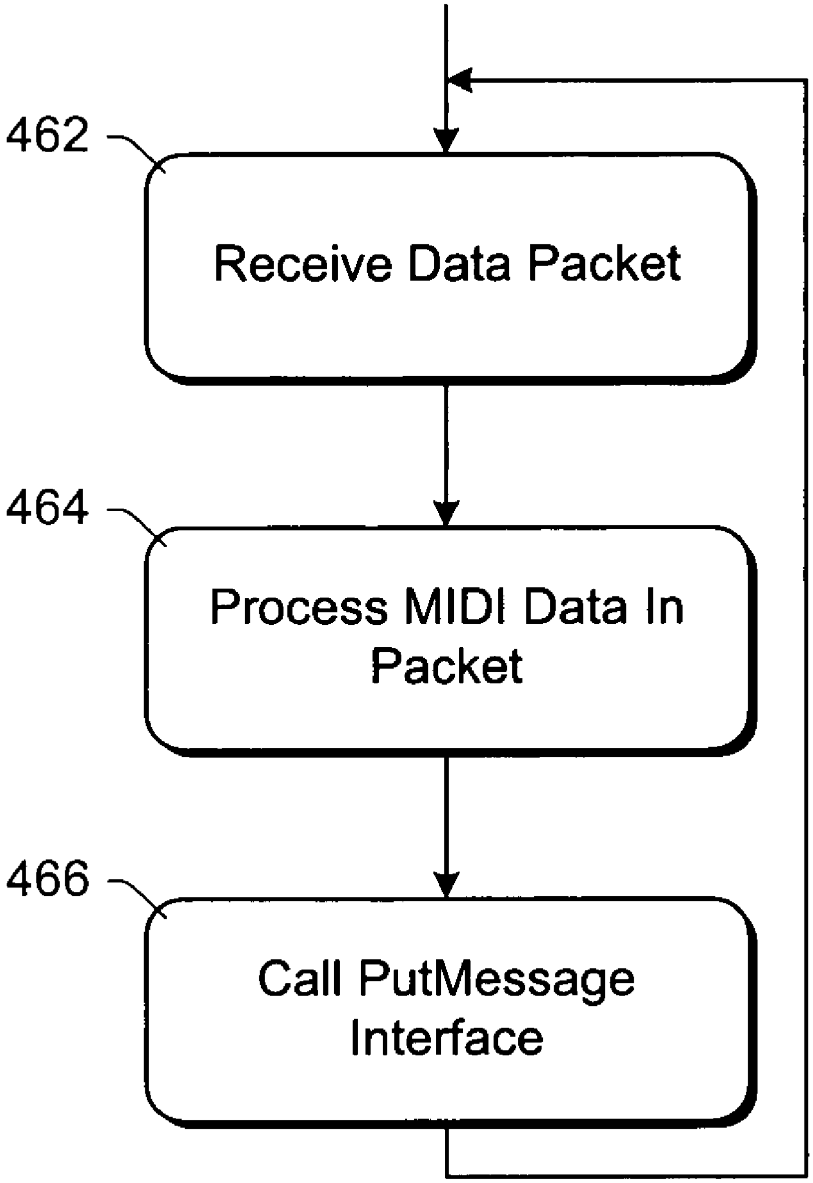
FIG. 11 is a flowchart illustrating an exemplary process for the operation of a module in a MIDI transform module graph in accordance with certain embodiments of the invention.

FIG. 11 is a flowchart illustrating an exemplary process for the operation of a module in a MIDI transform module graph in accordance with certain embodiments of the invention. In the illustrated example, the process of FIG. 11 is implemented by a software module (e.g., module 326 of FIG. 3) executing on a computing device.

Initially, a data packet including MIDI data (e.g., a data packet 350 of FIG. 5) is received by the module (act 462) (when its own PutMessage interface is called). Upon receipt of the MIDI data, the module processes the MIDI data (act 464). The exact manner in which the data is processed is dependent on the particular module, as discussed above. Once processing is complete, the programmed PutMessage interface (which is on a different module) is called (act 468), forwarding the data packet to the next module in the graph.

Figure 12:
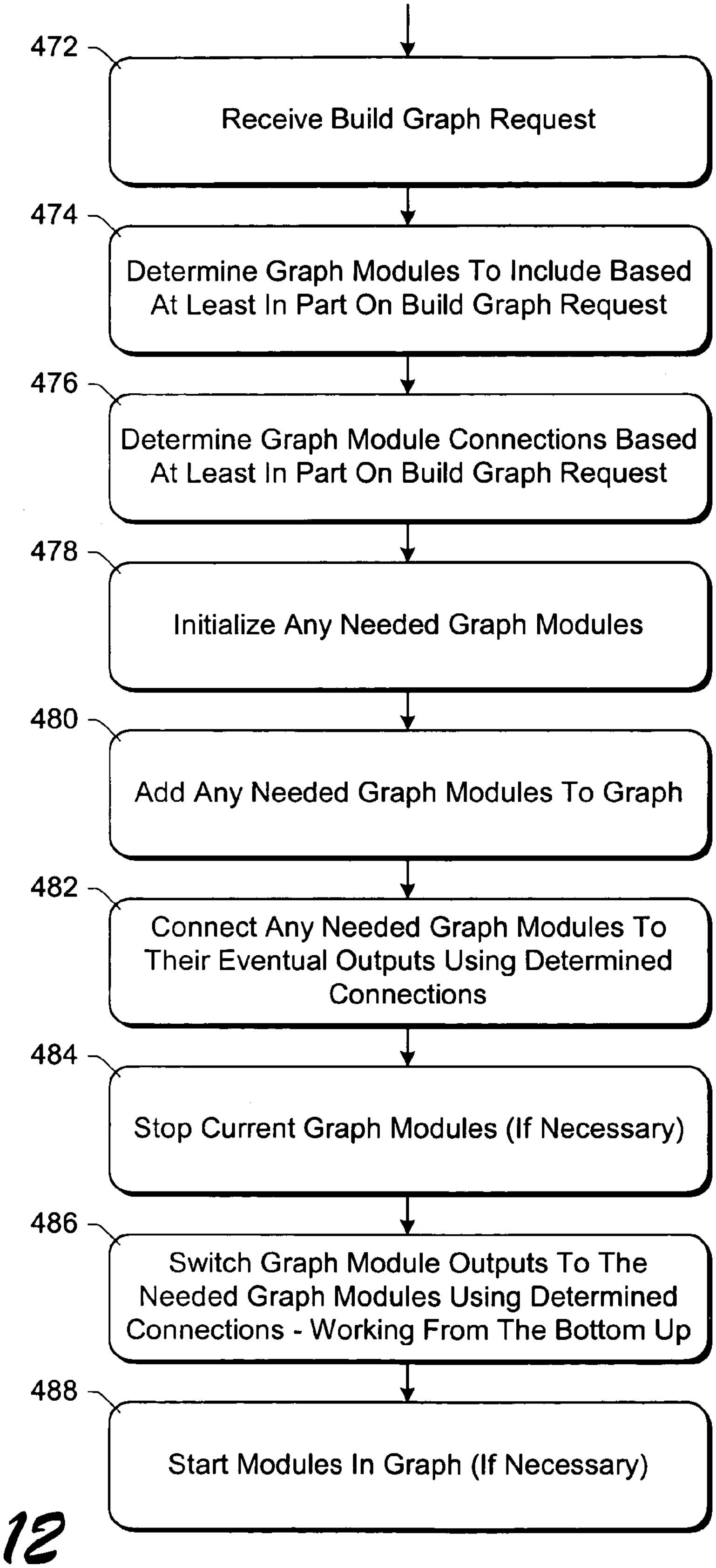
FIG. 12 is a flowchart illustrating an exemplary process for the operation of a graph builder in accordance with certain embodiments of the invention.

FIG. 12 is a flowchart illustrating an exemplary process for the operation of a graph builder in accordance with certain embodiments of the invention. In the illustrated example, the process of FIG. 12 is carried out by a graph builder 312 of FIG. 3 implemented in software. FIG. 12 is discussed with additional reference to FIG. 3. Although a specific ordering of acts is illustrated in FIG. 12, the ordering of the acts can alternatively be re-arranged.

Initially, graph builder 312 receives a request to build a graph (act 472). This request may be for a new graph or alternatively to modify a currently existing graph. The user-mode application 310 that submits the request to build the graph includes an identification of the functionality that the graph should include. This functionality can include any of a wide variety operations, including pitch bends, volume changes, aftertouch alterations, etc. The user-mode application also submits, if relevant, an ordering to the changes. By way of example, the application may indicate that the pitch bend should occur prior to or subsequent to some other alteration.

In response to the received request, graph builder 312 determines which graph modules are to be included based at least in part on the desired functionality identified in the request (act 474). Graph builder 312 is programmed with, or otherwise has access to, information identifying which modules correspond to which functionality. By way of example, a lookup table may be used that maps functionality to module identifiers. Graph builder 312 also automatically adds certain modules into the graph (if not already present). In one implementation, an allocator module is automatically inserted, an unpacker module is automatically inserted for each output path, and packer and capture sink modules are automatically inserted for each input path.

Graph builder 312 also determines the connections among the graph modules based at least in part on the desired functionality (and ordering, if any) included in the request (act 476). In one implementation, graph builder 312 is programmed with a set of rules regarding the building of graphs (e.g., which modules must or should, if possible, be prior to which other modules in the graph). Based on such a set of rules, the MIDI transform module graph can be constructed.

Graph builder 312 then initializes any needed graph modules (act 478). The manner in which graph modules are initialized can vary depending on the type of module. For example, pointers to the allocator module and reference clock may be passed to the module, other operating parameters may be passed to the module, etc.

Graph builder then adds any needed graph modules (as determined in act 474) to the graph (act 480), and connects the graph modules using the connections determined in act 476 (act 482). If any modules need to be temporarily paused to perform the connections, graph builder 312 changes the state of such graph modules to a stop state (act 484). The outputs for the added modules are connected first, and then the other modules are redirected to feed them, working in a direction "up" the graph from destination to source (act 486). This reduces the chances that the graph would need to be stopped to insert modules. Once connected, any modules in the graph that are not already in a run state are started (e.g., set to a run state) (act 488). Alternatively, another component may set the modules in the graph to the run state, such as application 310. In one implementation, the component (e.g., graph builder 312) setting the nodes in the graph to the run state follows a particular ordering. By way of example, the component may begin setting modules to run state at a MIDI data source and follow that through to a destination, then repeat for additional paths in the graph (e.g., in graph 430 of FIG. 8, the starting of modules may be in the following order: modules 436, 434, 438, 440, 442, 444, 446, 452). Alternatively, certain modules may be in a "start first" category (e.g., allocator 436 and sequencer 444 of FIG. 8).

In one implementation, graph builder 312 follows certain rules when adding or deleting items from the graph as well as when starting or stopping the graph. Reference is made herein to "merger" modules, branching modules, and branches within a graph. Merging is built-in to the interface described above, and a merger module refers to any module that has two or more other modules outputting to it (that is, two or more other modules calling its PutMessage interface). Graph builder 312 knows this information (who the mergers are), however the mergers themselves do not. A branching module refers to any module from which two or more branches extend (that is, any module that duplicates (at least in part) data and forwards copies of the data to multiple modules). An example of a branching module is a splitter module. A branch refers to a string of modules leading to or from (but not including) a branching module or merger module, as well as a string of modules between (but not including) merger and branching modules.

When moving the graph from a lower state (e.g., stop) to a higher state (e.g., run), graph builder 312 first changes the state of the destination modules, then works its way toward the source modules. At places where the graph branches (e.g., splitter modules), all destination branches are changed before the branching module (e.g., splitter module) is changed. In this way, by the time the "spigot is turned on" at the source, the rest of the graph is in run state and ready to go.

When moving the graph from a higher state (e.g., run) to a lower state (e.g., stop), the opposite tack is taken. First graph builder 312 stops the source(s), then continues stopping the modules as it progresses toward the destination module(s). In this way the "spigot is turned off" at the source(s) first, and the rest of the graph is given time for data to empty out and for the modules to "quiet" themselves. A module quieting itself refers to any residual data in the module being emptied out (e.g., an echo is passively allowed to die off, etc.). Quieting a module can also be actively accomplished by putting the running module into a lower state (e.g., the pause state) until it is no longer processing any residual data (which graph builder 312 can determine, for example, by calling its GetParameters interface).

When a module is in stop state, the module fails any calls to the module's PutMessage interface. When the module is in the acquire state, the module accepts PutMessage calls without failing them, but it does not forward messages onward. When the module is in the pause state, it accepts PutMessage calls and can work normally as long as it does not require the clock (if it needs a clock, then the pause state is treated the same as the acquire state). Clockless modules are considered "passive" modules that can operate fully during the "priming" sequence when the graph is in the pause state. Active modules only operate when in the run state. By way of example, splitter modules are passive, while sequencer modules, miniport streams, packer modules, and unpacker modules are active.

Different portions of a graph can be in different states. When a source is inactive, all modules on that same branch can be inactive as well. Generally, all the modules in a particular branch should be in the same state, including source and destination modules if they are on that branch. Typically, the splitter module is put in the same state as its input module. A merger module is put in the highest state (e.g., in the order stop, pause, acquire, run) of any of its input modules.

Graph builder 312 can insert modules to or delete modules from a graph "live" (while the graph is running). In one implementation, any module except miniport streams, packers, unpackers, capture sinks, and sequencers can be inserted to or deleted from the graph while the graph is running. If a module is to be added or deleted while the graph is running, care should be taken to ensure that no data is lost when making changes, and when deleting a module that the module is allowed to completely quiet itself before it is disconnected.

By way of example, when adding a module B between modules A and C, first the output of module B is connected to the input of module C (module C is still being fed by module A). Then, graph builder 312 switches the output of module A from module C to module B with a single ConnectOutput call. The module synchronizes ConnectOutput calls with PutMessage calls, so accomplishing the graph change with a single ConnectOutput call ensures that no data packets are lost during the switchover. In the case of a branching module, all of its outputs are connected first, then its source is connected. When adding a module immediately previous to a merger module (where the additional module is intended to be common to both data paths), the additional module becomes the new merger module, and the item that was previously considered a merger module is no longer regarded as a merger module. In that case, the new merger module's output and the old merger module's input are connected first, then the old merger module's inputs are switched to the new merger module's inputs. If it is absolutely necessary that all of the merger module's inputs switch to the new merger at the same instant, then a special SetParams call should be made to each of the "upstream" input modules to set a timestamp for when the ConnectOutput should take place.

When deleting a module B from between modules A and C, first the output of module A is connected to the input of module C (module B is effectively bypassed at this time). Then, after module B empties and quiets itself (e.g., it might be an echo or other time-based effect), its output is reset to the allocator. Then module B can be safely destroyed (e.g., removed from the graph). When deleting a merger module, first its inputs are switched to the subsequent module (which becomes a merger module now), then after the old merger module quiets, its output is disconnected. When deleting a branching module, this is because an entire branch is no longer needed. In that case, the branching module output going to that branch is disconnected. If the branching module had more than two outputs, then the graph builder calls DisconnectOutput to disconnect that output from the branching module's output list. At that point the subsequent modules in that branch can be safely destroyed. However, if the branching module had only two connected outputs, then the splitter module is no longer necessary. In that case, the splitter module is bypassed (the previous module's output is connected to the subsequent module's input), then after the splitter module quiets it is disconnected and destroyed.

Additional Transform Modules

Specific examples of modules that can be included in a MIDI transform module graph (such as graph 430 of FIG. 9, graph 454 of FIG. 10, or graph 314 of FIG. 3) are described above. Various additional modules can also be included in a MIDI transform module graph, allowing user-mode applications to generate any of a wide variety of audio effects. Furthermore, as graph builder 312 of FIG. 3 allows the MIDI transform module graph to be readily changed, the functionality of the MIDI transform module graph can be changed to include new modules as they are developed. Examples of additional modules that can be included in a MIDI transform module graph are described below.

Unpacker Modules. Unpacker modules, in addition to those discussed above, can also be included in a MIDI transform module graph. Unpacker modules operate to receive data into the graph from a user-mode application, converting the MIDI data received in the user-mode application format into data packets 350 (FIG. 6) for communicating to other modules in the graph. Additional unpacker modules, supporting any of a wide variety of user-mode application specific formats, can be included in the graph.

Packer Modules. Packer modules, in addition to those discussed above, can also be included in a MIDI transform module graph. Packer modules operate to output MIDI data from the graph to a user-mode application, converting the MIDI data from the data packets 350 into a user-mode application specific format. Additional packer modules, supporting any of a wide variety of user-mode application specific formats, can be included in the graph.

Feeder In Modules. A Feeder In module operates to convert MIDI data received in from a software component that is not aware of the data formats and protocols used in a module graph (e.g., graph 314 of FIG. 3) into data packets 350. Such components are typically referred to as "legacy" components, and include, for example, older hardware miniport drivers. Different Feeder In modules can be used that are specific to the particular hardware drivers they are receiving the MIDI data from. The exact manner in which the Feeder In modules operate will vary, depending on what actions are necessary to convert the received MIDI data to the data packets 350.

Feeder Out Modules. A Feeder Out module operates to convert MIDI data in data packets 350 into the format expected by a particular legacy component (e.g., older hardware miniport driver) that is not aware of the data formats and protocols used in a module graph (e.g., graph 314 of FIG. 3). Different Feeder Out modules can be used that are specific to the particular hardware drivers they are sending the MIDI data to. The exact manner in which the Feeder Out modules operate will vary, depending on what actions are necessary to convert the MIDI data in the data packets 350 into the format expected by the corresponding hardware driver.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

What is claimed is:

1. A system comprising:

a first module implemented in kernel-mode and coupled to receive audio data from hardware, wherein the first module is to process the audio data by obtaining a data packet structure into which the audio data can be placed, wherein the data packet structure includes:

a data portion that can include one of: the audio data, a pointer to a chain of additional data packet structures that include the audio data, and a pointer to a data buffer, and an event byte count portion that identifies, if the data portion does not include the pointer to the chain of additional data packet structures, whether the data portion includes the audio data or a pointer to the data buffer, a second module implemented in kernel mode and coupled to communicate processed audio data to an application executing in user-mode; and a third module, implemented in kernel-mode, to receive the audio data from the first module, process the audio data, and communicate the processed audio data to the second module.

2. A system as recited in claim 1, wherein the first module is further to process the audio data before forwarding the audio data to the second module.

3. A system as recited in claim 1, further comprising additional modules, situated between the first and third modules, to further process the audio data.

4. One or more computer-readable media having stored thereon a series of instructions that, when executed by one or more processors of a computer, causes the one or more processors to perform acts including:

maintaining a pool of memory available for allocation to a plurality of transform filters executing at a privileged level;

allocating a portion of the pool of memory to one of the plurality of transform filters to use to store audio data, wherein the portion comprises sufficient memory to store a data structure including:

a data portion that can include one of: audio data, a pointer to a chain of additional data structures that include the audio data, and a pointer to a data buffer;

a structure byte count portion that identifies the size of the data structure;

a channel group portion that identifies which of a plurality of channel groups the data identified in the data portion corresponds to;

a presentation time portion indicating when audio data is to be rendered;

a flag portion indicating whether the data portion includes either the pointer to the chain of additional data structures or one of either the audio data or the pointer to the data buffer; and an event byte count portion that identifies, if the data portion does not include the pointer to the chain of additional data structures, whether the data portion includes the audio data or a pointer to the data buffer; and returning the allocated portion to the pool of memory after the plurality of transform filters have finished processing the audio data.

5. One or more computer-readable media as recited in claim 4, wherein the privileged level comprises kernel-mode.

6. One or more computer-readable media as recited in claim 4, wherein the portion comprises a data buffer to store a plurality of audio data messages.

7. One or more computer-readable media as recited in claim 4, wherein the series of instructions, when executed, further cause the one or more processors to perform acts including requesting additional memory, from a memory manager, to add to the pool of memory.

8. One or more computer-readable media as recited in claim 7, wherein the series of instructions, when executed, further cause the one or more processors to perform acts including requesting additional non-paged memory from the memory manager to add to the pool of memory.

* * * * *

UNITED STATES PATENT AND TRADEMARK OFFICE

CERTIFICATE OF CORRECTION

PATENT NO. : 6,961,631 B1
APPLICATION NO. : 09/559901
DATED : November 1, 2005
INVENTOR(S) : Puryear It is certified that error appears in the above-identified patent and that said Letters Patent is hereby corrected as shown below:

In column 11, line 21, delete ""processing."The" and insert -- "processing." The --, therefor.

In column 13, line 15, after "flowing" delete "11".

In column 15, line 48, after "at the" delete "19".

In column 17, line 32, delete "sequencer–module" and insert -- sequencer module --, therefor.

In column 23, line 5, in Claim 1, after "buffer" delete "," and insert -- ; --, therefor.

Signed and Sealed this

First Day of September, 2009

David J. Kappos

*Director of the United States Patent and Trademark Office*